US012711677B2

(12) United States Patent
Dhanuka et al.

(10) Patent No.: US 12,711,677 B2
(45) Date of Patent: Aug. 18, 2026

(54) AUTOMATED PROPAGATION OF GLYPH EDITS TO CORRESPONDING ADORNMENT

(71) Applicant: Adobe Inc., San Jose, CA (US)

(72) Inventors: Praveen Kumar Dhanuka, West Bengal (IN); Arushi Jain, Delhi (IN); Shivi Pal, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 284 days.

(21) Appl. No.: 18/356,749

(22) Filed: Jul. 21, 2023

(65) Prior Publication Data

US 2025/0029294 A1 Jan. 23, 2025

(51) Int. Cl.

| | |
|---|---|
| ***G06T 11/20*** | (2026.01) |
| ***G06F 40/109*** | (2020.01) |
| ***G06T 11/23*** | (2026.01) |
| ***G06T 11/60*** | (2006.01) |

(52) U.S. Cl.

CPC ............ *G06T 11/23* (2026.01); *G06F 40/109* (2020.01); *G06T 11/60* (2013.01)

(58) Field of Classification Search

CPC ....... G06T 11/203; G06T 11/60; G06F 40/109
USPC .......................................................... 345/467
See application file for complete search history.

(56) References Cited

U.S. PATENT DOCUMENTS 11,755,817 B2 9/2023 Dhanuka et al.

OTHER PUBLICATIONS

Luecke, Karsten, DTL OTMaster Manual, Sep. 2, 2016, 108 pages (Year: 2016).*

* cited by examiner

*Primary Examiner* — Thomas J Lett
(74) *Attorney, Agent, or Firm* — Shook, Hardy & Bacon L.L.P.

(57) ABSTRACT

Methods, computer systems, computer-storage media, and graphical user interfaces are provided for automated propagation of glyph edits to corresponding adornments. In embodiments, an indication to attach an adornment to a glyph associated with a variable font is identified. Thereafter, an anchor point indicating a point of attachment of the adornment to the glyph is identified. Based on obtaining an indication to modify a variable font property associated with the glyph, an edit to apply to the adornment is determined. Generally, the edit maintains an alignment of the adornment with a modified anchor point reflecting the modified variable font property associated with the glyph. Thereafter, the edit is applied to the adornment.

18 Claims, 9 Drawing Sheets

AUTOMATED PROPAGATION OF GLYPH EDITS TO CORRESPONDING ADORNMENT

BACKGROUND

A designer may position an adornment adjacent to a glyph for a visually seamless output. For instance, the designer may desire to provide the appearance of an adornment being attached to a glyph. The design process to generate an output of an adornment appearing integrated with, or attached to, a glyph can be tedious and time consuming. For example, as the glyph and adornment are disjointed, manipulation or rearrangement of the adornment is manually performed each instance the glyph is edited. As such, as a designer edits aspects of a glyph, the designer also must manually adjust the adornment as appropriate. This process is increasingly tedious with the advent of variable font, as designers tend to initiate even more edits to glyphs in a design to achieve a particular visual appeal. By way of example only, upon positioning an adornment in proximity with a glyph, assume a designer modifies a variable property on a variable font such that the property is applied to the glyph (e.g., the glyph becomes wider). In such a case, in conventional implementations, to maintain a desired spatial arrangement, the designer must readjust the adornment position and/or scale accordingly. Each instance a variable font property is modified, such manual readjustment of the adornment occurs in order to maintain a desired spatial arrangement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating automated propagation of glyph edits to a corresponding adornment(s). In this regard, an adornment modification is automatically applied to an adornment corresponding with a glyph in accordance with an edit applied to the glyph, such as a modification to a variable font property of the glyph. In particular, based on an association of an adornment and a glyph, an edit or modification to a variable font property for the glyph results in a manipulation of the corresponding adornment, such that the adornment is modified consistently or appropriately to appear visually seamless with the glyph.

BRIEF DESCRIPTION OF DRAWINGS

The technology described herein is described in detail below with reference to the attached drawing figures, wherein.

DETAILED DESCRIPTION

Figure 1:
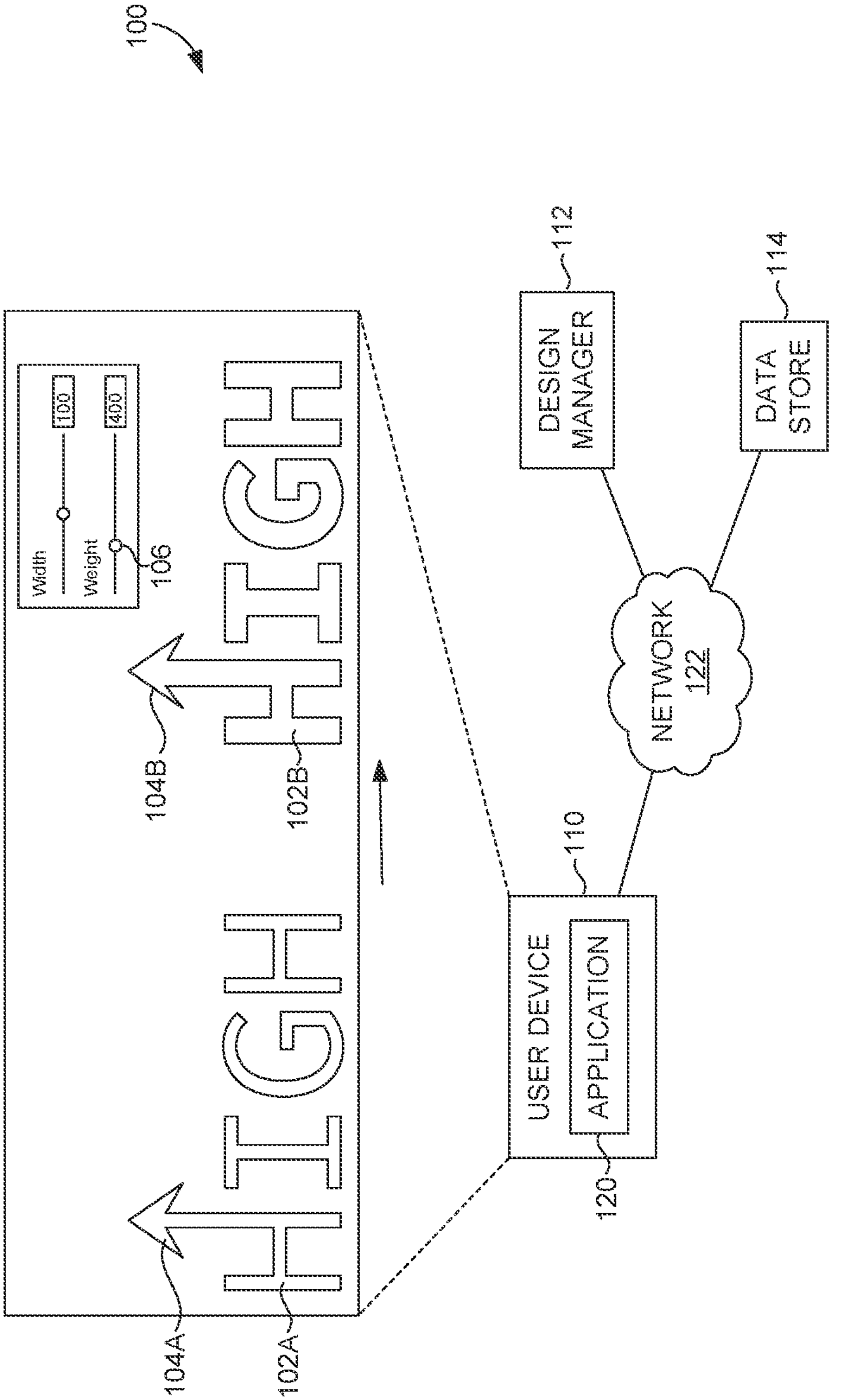
FIG. 1 is a block diagram of an exemplary system for facilitating automated propagation of glyph edits to corresponding adornment, suitable for use in implementing aspects of the technology described herein.

Oftentimes, designers create or place an adornment adjacent to a glyph for a visually seamless output. In this regard, the designer may desire to provide the appearance of an adornment being attached to a glyph. The design process to generate an output of an adornment appearing integrated with, or attached to, a glyph can be tedious and time consuming. For example, as the glyph and adornment are disjointed, manipulation or rearrangement of the adornment is manually performed each instance the glyph is edited. As such, as a designer edits aspects of a glyph, the designer also must manually adjust the adornment as appropriate.

With the advent of variable font, designers tend to perform even more edits to glyphs in a design to achieve a particular visual appeal. A variable font generally refers to font that has various style variations due to variable axes. With variable fonts, a designer can select or specify various parameters associated with the font, as opposed to parameters that are specified by the font type designer. By way of example only, a designer may select a weight, a width, an x-height, a slant, etc. to be associated with the font.

As designers may adjust various properties associated with a variable font, the manual design process to generate an output that provides an adornment appearing visually seamless with a glyph is even more tedious. For example, upon positioning an adornment in proximity with a glyph, assume a designer modifies a variable property on a variable font such that the property is applied to the glyph (e.g., the glyph becomes wider). In such a case, in conventional implementations, to maintain a desired spatial arrangement, the designer must readjust the adornment position and/or scale accordingly. Each instance a variable font property is modified, such manual readjustment of the adornment occurs in order to maintain a desired spatial arrangement.

In one conventional implementation, a designer can convert a desired glyph into an outline (e.g., a graphic image) such that an adornment can be attached thereto. For example, a designer can attach or merge an adornment with a particular glyph by placing the adornment in proximity to the glyph to generate a group element. Such a group element can be included in a text object as inline graphics. Converting a glyph into an outline, however, eliminates the ability to edit the glyph itself, including variable properties associated with the glyph. As such, properties associated with the glyph can no longer be variably adjusted by a designer and, accordingly, a desired appearance may be difficult to achieve. Accordingly, in cases in which a designer desires to modify the glyph, the designer may need to initiate a new design or revert to the glyph before it was converted to an outline form. Further, such a manual process of creating inline graphics can be time consuming for a designer.

In addition to being time consuming and tedious to achieve an adornment appearing visually seamless with a glyph, such manual processes unnecessarily utilize computing resources. For example, upon positioning an adornment in proximity with a glyph, assume a designer modifies a variable property on a variable font such that the property is applied to the glyph (e.g., the glyph becomes wider). In such a case, the designer must readjust the adornment position and/or scale accordingly to maintain a desired appearance, thereby unnecessarily using computing resources to perform the adjustments. The computing resource utilization is exacerbated in cases in which multiple edits are applied. As another example, as described, effectuating a modification to a glyph converted to an outline can include generating a new design altogether or reverting to the glyph before it was converted to an outline form. Effectuating either of such processes unnecessarily consumes computing resources. Further, additional computing resources are used in cases in which a designer creates inline graphics in an effort to achieve an adornment appearing visually seamless with a glyph.

Accordingly, embodiments of the present technology are directed to facilitating automated propagation of glyph edits to a corresponding adornment. In this regard, an adornment modification is automatically applied to an adornment corresponding with a glyph in accordance with an edit applied to the glyph, such as a modification to a variable font property of the glyph. In particular, based on an association of an adornment and a glyph, an edit or modification to a variable font property for the glyph results in a manipulation of the corresponding adornment, such that the adornment is modified consistently or appropriately to appear visually seamless with the glyph.

In operation, to perform automated propagation of glyph edits to a corresponding adornment(s), anchor point(s) associated with the adornment and/or glyph is identified. An anchor point represents a position or point at which an adornment is indicated or identified as attached to a glyph. The anchor point(s) can be indicated or represented in various forms, including as a position relative to a Bezier curve. Such an anchor point(s), among other data, can be stored as an attachment dataset for subsequent use in effectuating automated adornment edit propagation. In this way, in association with a modification of a variable font property associated with a glyph, the corresponding attachment data, including the anchor point(s), can be referenced and used to determine a new arrangement or position of the adornment such that the edit applied to the glyph is propagated to the adornment.

Advantageously, utilizing embodiments described herein, automated propagation of glyph edits to a corresponding adornment is performed in an efficient and effective manner. In this way, the adornment appears seamless with the glyph, even as modifications are made to the glyph, without requiring manual edits made to adjust the adornment. Further, computing resources are utilized in an efficient manner as computing resources are not unnecessarily used to generate and render manual adornment edits, including utilization of inline graphics in an effort to achieve a seamless appearance. As such, using implementations described herein enables efficient and effective propagation of glyph edits to a corresponding adornment in an automated manner, thereby reducing unnecessary utilization of computing resources and increasing efficiency of computing resources.

Referring initially to FIG. 1, a block diagram of an exemplary network environment 100 suitable for use in implementing embodiments described herein is shown. Generally, the system 100 illustrates an environment suitable for facilitating automated propagation of glyph edits to a corresponding adornment(s) in an effective and efficient manner. Among other things, embodiments described herein enable automatic manipulation or modification of an adornment when a corresponding glyph is adjusted or modified. In particular, as a variable font property (e.g., width, x-width, weight, etc.) associated with a glyph is modified, a corresponding adornment is automatically adjusted in accordance therewith. To do so, anchor points associated with the adornment and/or glyph are identified. An anchor point represents a position or point at which an adornment is indicated or identified as attached to a glyph. The anchor points can be indicated or represented in various forms, including as a position relative to a Bezier curve. Such anchor points, among other data, can be stored as an attachment dataset for subsequent use in effectuating automated adornment edit propagation. In this way, in association with a modification of a variable font property associated with a glyph, the corresponding attachment data can be referenced and used to determine a new arrangement or position of the adornment such that the edit applied to the glyph is propagated to the adornment. Advantageously, using implementations described herein enables efficient and effective propagation of glyph edits to a corresponding adornment in an automated manner, thereby reducing unnecessary utilization of computing resources and increasing efficiency of computing resources.

The network environment 100 includes a user device 110, a design manager 112, and a data store 114. The user device 110, the design manager 112, and the data store 114 can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the exemplary network environment 100 be interpreted as having any dependency or requirement related to any single component or combination of components illustrated therein. For example, the user device 110 may be in communication with the design manager 112 via a mobile network or the Internet, and the user device 110 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another, for example, at least a portion of the data store 114 may be integrated with the user device 110.

As described, a user device, such as user device 110, facilitates automated propagation of glyph edits to a corresponding adornment(s) in an effective and efficient manner. Automated propagation of glyph edits to a corresponding adornment enables a more efficient and more accurate process for propagating glyph edits to an adornment, thereby providing a more desirable implementation and output to the user (e.g., a designer).

User device 110 can be a client device on a client-side of operating environment 100, while design manager 112 can be on a server-side of operating environment 100. Design manager 112 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of user device 110 and/or design manager 112 to remain as separate entities.

In an embodiment, the user device 110 is separate and distinct from the design manager 112 and the data store 114. In another embodiment, the user device 110 is integrated with one or more illustrated components. For instance, the user device 110 may incorporate functionality described in relation to the design manager 112. For clarity of explanation, embodiments are described herein in which the user device 110, the design manager 112, and the data store 114 are separate, while understanding that this may not be the case in various configurations contemplated.

The user device 110 can be any kind of computing device capable of facilitating automated propagation of glyph edits to a corresponding adornment(s). For example, in an embodiment, the user device 110 can be a computing device such as computing device 900, as described above with reference to FIG. 9. In embodiments, the user device 110 can be a personal computer (PC), a laptop computer, a workstation, a mobile computing device, a PDA, a cell phone, or the like. In embodiments, the user device 110 includes a display screen on which a user interface may be displayed to support user interaction. In some implementations, the user device 110 includes the display screen. That is, a display screen is integrated or coupled with the user device. In other implementations, a display screen is remote from, but in communication with, the user device. The display screen is a screen or monitor that can visually present, display, or output information, such as text.

The user device can include one or more processors, and one or more computer-readable media. The computer-readable media may include computer-readable instructions executable by one or more processors. The instructions may be embodied by one or more applications, such as application 120 shown in FIG. 1. The application(s) may generally be any application capable of facilitating automated propagation of glyph edits to a corresponding adornment(s). In embodiments, the application may be a design application or a content creation application that includes functionality to generate content or designs, including text. In particular, a design application or a content creation application may be used to attach an adornment to a glyph and, in response to an edit of the glyph, automatically propagate edits to the adornment such that the adornment is manipulated in a corresponding manner.

In some implementations, the application(s) comprises a mobile application or a web application, which can run in a web browser, and could be hosted at least partially server-side (e.g., via design manager 112). In addition, or instead, the application(s) can comprise a dedicated application or a stand-alone application. In some cases, the application is integrated into the operating system (e.g., as a service). In some cases, the functionality described herein may be integrated directly with an application or may be an add-on, or plug-in, to an application. One example of an application that may be used to edit and/or present designs, including text, is Illustrator® provided by Adobe®.

A user device 110 and/or application 120 is generally operated by an individual (e.g., a designer) or entity interested in generating a design including text. The user device 110 and/or application 120 may accept and process user inputs or edits related to a glyph. A user, for example, may provide inputs or edits using a selector/cursor control device, touch, gesture, stylus, and so on to create content and/or initiate edits. In some cases, attaching or linking an adornment to a glyph to facilitate edit propagation to the adornment may be initiated at the user device 110. For example, in some cases, a user may explicitly select an adornment and a glyph as well as a command to attach or link the adornment and glyph. For instance, upon selecting an adornment and a glyph (e.g., via a user interface), an attach command may be selected via a menu (e.g., presented based on a right click, a drop down menu, etc.). As another example, an adornment and a glyph may be identified to be attached based on a detection of a portion of an adornment (e.g., an edge or object point(s)) overlapping or within a distance proximity to an edge or object point(s) of a glyph. For example, in association with a user moving an adornment adjacent to a glyph, or vice versa, an attachment of the adornment and glyph may be identified.

The user device 110 and/or application 120 can communicate with the design manager 112 to initiate and/or execute automated propagation of glyph edits to a corresponding adornment(s). In embodiments, for example, a user may utilize the user device 110 to initiate automated propagation of glyph edits to a corresponding adornment via the network 122. For instance, in some embodiments, the network 122 might be the Internet, and the user device 110 and/or application 120 interacts with the design manager 112 to initiate automated propagation of glyph edits to a corresponding adornment(s). In other embodiments, for example, the network 122 might be an enterprise network associated with an organization. In yet other embodiments, the design manager 112 may additionally or alternatively operate locally on the user device 110 to perform functionality at the user device. For example, the design manager 112 may be incorporated as a tool or functionality performed via the application 120. It should be apparent to those having skill in the relevant arts that any number of other implementation scenarios may be possible as well.

As such, the design manager 112 can be implemented in any number of ways. For example, the design manager 112 can be implemented as a tool that executes within application 120. In this regard, the design manager 112 might operate at the user device to provide local functionality. As another example, the design manager 112 can be implemented as server systems, program modules, virtual machines, components of a server or servers, networks, and the like. In this way, such a design manager 112 may communicate with application 120 operating on user device 110 to provide back-end services to application 120.

At a high level, the design manager 112 manages glyph edit propagation to corresponding adornments. In this regard, in association with an attachment of an adornment to a glyph, the design manager 112 facilitates propagation of glyph edits to the attached adornment. To do so, an anchor point(s) associated with the adornment and/or glyph are identified. An anchor point represents a position or point at which an adornment is indicated or identified as attached to a glyph. The anchor point(s) can be indicated in various forms, including as a position relative to a Bezier curve. Such anchor points, among other data, can be stored as an attachment dataset for subsequent use in effectuating automated adornment edit propagation. In this way, in association with a modification of a variable font property associated with a glyph, the corresponding attachment data can be referenced and used to determine a new arrangement or position of the adornment such that the edit applied to the glyph is propagated to the adornment. Advantageously, using implementations described herein enables efficient and effective propagation of glyph edits to a corresponding adornment in an automated manner, thereby reducing unnecessary utilization of computing resources and increasing efficiency of computing resources.

Based on edit modifications identified to be applied or propagated to an adornment, the adornment is modified accordingly. In this way, the adornment is rendered and/or displayed, via user device 110 and/or application 120, in a manner that is consistent with modifications made to a corresponding or attached glyph. For example, as shown in FIG. 1, assume an adornment 104A is attached to a glyph 102A. For instance, a user may have moved the adornment 104A adjacent to the glyph 102A and confirmed a desire to attach the adornment 104A and glyph 102A. Now assume the user desires to modify the weight of the font. For instance, the user may view variable font parameters and select to modify the weight of the font by moving slider 106 to increase the weight of the font. As shown, the weight of the glyph 102B is increased. In conventional implementations, a user would be required to manually adjust the adornment 104B to have the adornment 104B appear seamless with the glyph 102B. In accordance with embodiments described herein, however, the adornment 104B is adjusted or transformed such that it appears seamless with the adjusted glyph, as shown in 104B.

Although various aspects of the technology described herein are directed to propagating edits applied to a glyph to a corresponding adornment, as can be appreciated, in other embodiments, edits applied to an adornment may be propagated to a corresponding glyph. In this way, in cases that a user manipulates or modifies an adornment attached to a glyph, the edits may be automatically applied to the corresponding glyph.

Figure 2:
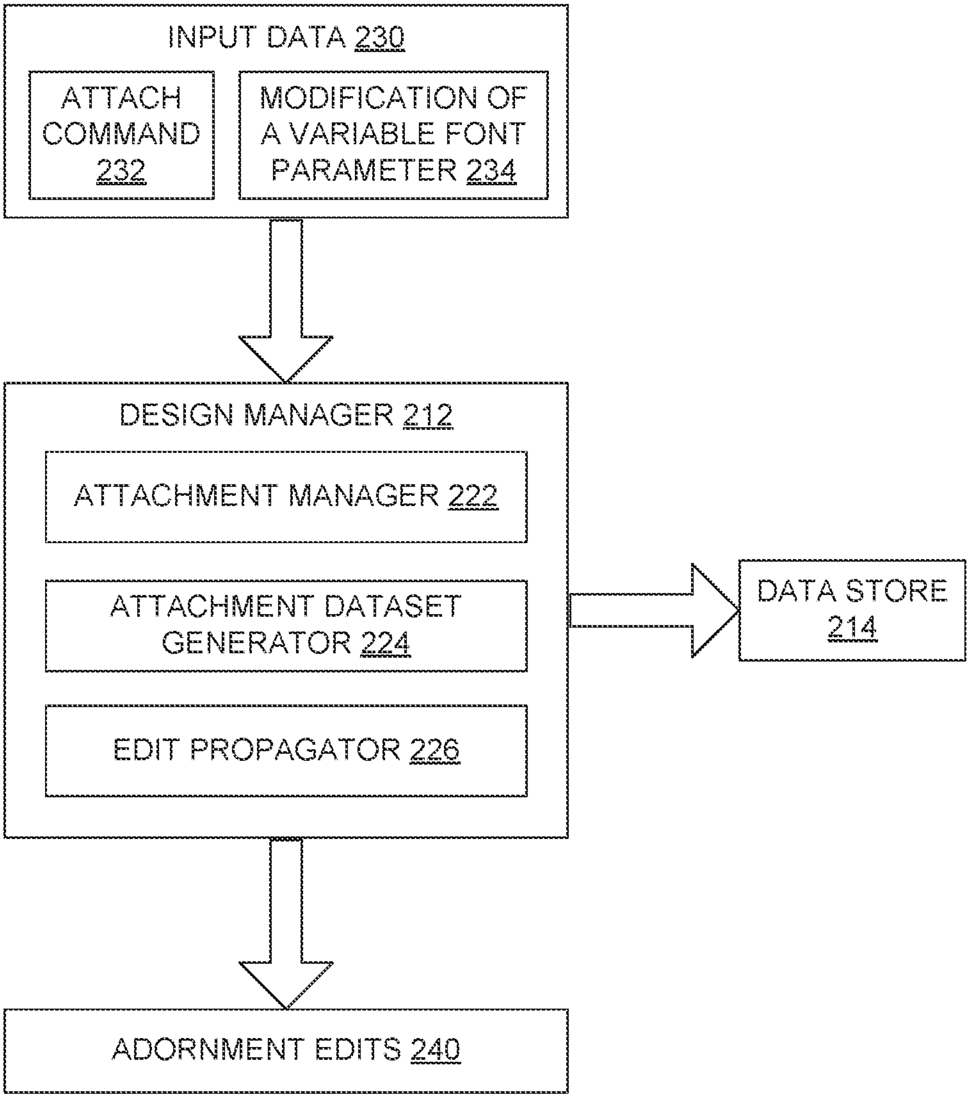
FIG. 2 is an example implementation for facilitating automated propagation of glyph edits to corresponding adornment, in accordance with aspects of the technology described herein.

Turning now to FIG. 2, FIG. 2 illustrates an example implementation for facilitating glyph edit propagations to a corresponding adornment(s), in accordance with embodiments described herein. The design manager 212 can communicate with the data store 214. The data store 214 is configured to store various types of information, such as variable font property data, glyph data, adornment data, and/or attachment data, accessible by the design manager 212 or other component. In embodiments, user devices (such as user device 110 of FIG. 1) and/or design manager 212 can provide data that is stored in the data store 214, which may be retrieved or referenced by any such component.

As described herein, a variable font property generally refers to a property applied to a variable font, or glyph associated therewith. For example, a variable font property may be a weight associated with a variable font, a width associated with a variable font, and/or an x-height associated with a variable font. Variable font property data includes any data associated with a variable font property. For example, variable font property may include an indication of the variable font property (e.g., weight), a value of the variable font property, and/or the like. A value of the variable font property, or a variable font property value, indicates an extent or level of the property. Such a variable font property value can be designated in any number of ways. As some examples, a variable font property value may be a numeral indicating a size, a percentage, a range of numerals or sizes, a text description (e.g., indicating a size, such as small, medium, large), etc. Glyph data generally refers to data associated with a glyph. Glyph data may include indications of object points associated with a glyph, anchor points associated with a glyph, paths associated with a glyph, and/or the like. Adornment data generally refer to data associated with an adornment. Adornment data may include indications of object points associated with an adornment, anchor points associated with an adornment, paths associated with an adornment, and/or the like. Attachment data generally refer to data associated with an attached or linked glyph and adornment. In this way, attachment data may include any data associated with the glyph and/or any data associated with the adornment. By way of example only, attachment data may include indications of anchor points associated with a glyph and/or adornment, paths associated with a glyph and/or adornment, object points associated with a glyph and/or adornment, adornment identifier, glyph identifier, and/or the like.

In operation, the design manager 212 is generally configured to facilitate glyph edit propagations to corresponding adornments, in accordance with embodiments described herein. As described, an adornment generally refers to an external art, design, or object that can be attached to a glyph, generally to add to the design of the glyph for visual appeal. An adornment may be in any shape and size and may represent any type of design. A glyph generally refers to a representation of a character, such as a letter, a numeral, a symbol, or other character. In embodiments, a glyph is a specific shape, design, or representation of a character. In this way, a glyph is a particular graphical representation of a character. For example, one design of the letter "A" can be represented by one glyph, while a different design of the letter "A" can be represented by another glyph. In accordance with embodiments described herein, based on an adornment being attached or linked to a particular glyph, when an edit is applied to the glyph, such as a modification of a variable font property, the attached adornment is edited accordingly.

In embodiments, the design manager 212 includes an attachment manager 222, an attachment dataset generator 224, and an edit propagator 226. According to embodiments described herein, the design manager 212 can include any number of other components not illustrated. In some embodiments, one or more of the illustrated components 222, 224, and 226 can be integrated into a single component or can be divided into a number of different components. Components 222, 224, and 226 can be implemented on any number of machines and can be integrated, as desired, with any number of other functionalities or services. As described herein, the design manager 212, or portion thereof, may reside locally at a user device. For example, the design manager 212 may be incorporated as part of a content creation or design application that is used to create or design content as well as edit content, including text.

The attachment manager 222 is generally configured to manage attachment or linkage between adornment and glyphs. In this regard, the attachment manager 222 can identify an indication to attach an adornment and a glyph. In embodiments, an indication to attach an adornment and a glyph is provided via a user, for example, interacting with user device 110 and/or application 120 of FIG. 1. For example, in some cases, a user may explicitly select an adornment and a glyph as well as a command to attach or link the adornment and glyph. For instance, upon selecting an adornment and a glyph (e.g., via a user interface), an attach command may be selected via a menu (e.g., presented based on a right click, a drop down menu, etc.). In this way, the design manager 212 may obtain input data 230 including attach command 232 to recognize a linked glyph and adornment. As another example, an adornment and a glyph may be identified to be attached based on a detection of a portion of an adornment (e.g., an edge, an object point(s), etc.) overlapping or within a distance proximity to a glyph (e.g., an edge of a glyph, an object point(s)). For instance, in association with a user moving an adornment adjacent to a glyph, or vice versa, an attachment of the adornment and glyph may be identified. In embodiments, an adornment can be attached to any editable glyph (e.g., associated with a variable font).

In association with identifying to attach an adornment with a particular glyph, the attachment manager 222 can identify or determine a set of one or more anchor points at which to attach the adornment with the glyph. An anchor point, as used herein, generally refers to a point at which an adornment is attached to a glyph or positioned in association with a glyph. An anchor point may be a point on the adornment and/or the glyph. As can be appreciated, any number of anchor points may be used. In some cases, a predetermined number of anchor points (e.g., one or two) may be used as a default number of anchor points. In other cases, a number of anchor points to use may vary and may depend, for example, on the shape of the adornment and/or the shape of the glyph. For example, a curved path may have more or less anchor points than a straight path of an adornment and/or a glyph.

Figure 3:
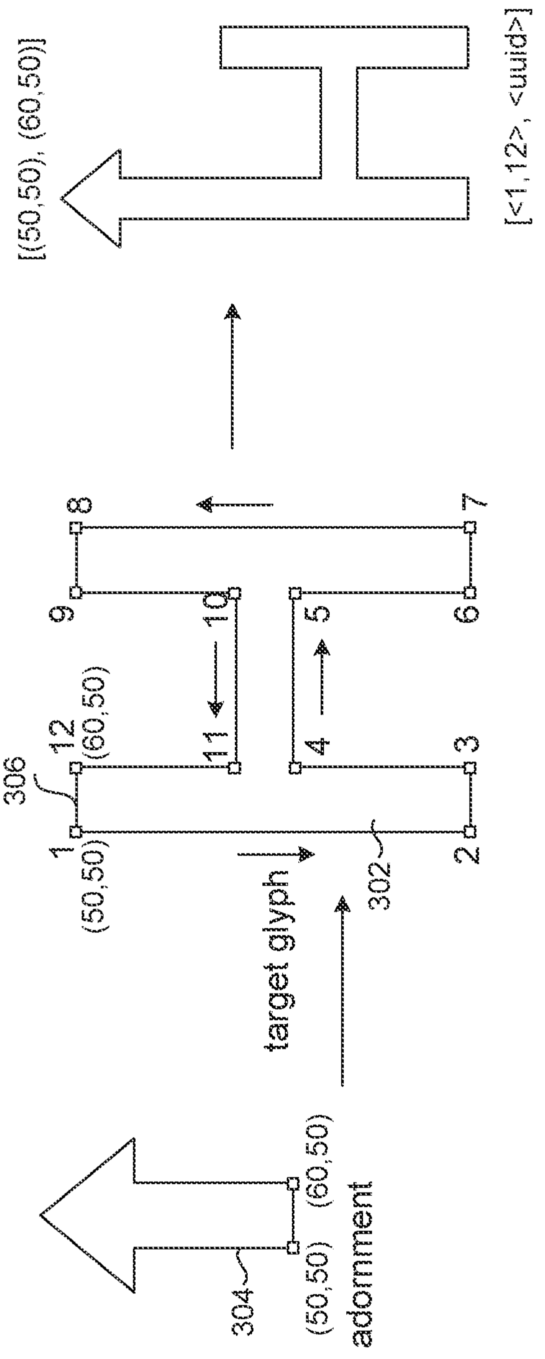
FIG. 3 provides an example target glyph and adornment, in accordance with embodiments described herein.

An anchor point(s) can be identified or determined in any number of ways. As one example, anchor points can be identified using an object point(s) associated with the glyph and/or adornment. As described, glyphs and/or adornments can include a set of object points. Generally, the object points are positioned around the edge or outline of a glyph or an adornment, or along a path of a glyph or an adornment. The object points can be identified by an object point identifier. In some cases, object points are identified using numerals. For example, object point identifiers may correspond with a set of sequential numbers. By way of example only, and as shown in FIG. 3, the target glyph H 302 has twelve points, identified sequentially be numerals one through twelve. Although this example uses numerals to represent the different object points, as can be appreciated, the object points can be represented in any number of ways (e.g., letters, symbols, etc.). Glyphs and/or adornments may have any number of object points. In some cases, the number of object points may be based on the paths and path segments associated with the glyph or adornment.

In this regard, in some embodiments, identifying an anchor point(s) for attaching an adornment to a glyph includes identifying a particular object point(s) associated with the glyph and/or adornment corresponding with a point of attachment. Continuing with the above example, and with reference to FIG. 3, based on the placement of the adornment 304, it can be determined that object point 1 and object point 12 are points for attaching the "H" glyph 302 and the adornment 304 and, as such, are be identified as anchor points. Such anchor points may be indicated or represented in any number of ways. In some cases, the anchor points can be represented using the object point identifier. In this example, the anchor points are identified via object point identifiers 1 and 12. Additionally or alternatively, anchor points can be identified using a position or location of the object point. For example, an anchor point can be represented as a pixel location or position (e.g., via an x and/or y coordinate or pixel position) associated with an object point corresponding with a point of attachment.

Identifying an object point as an attachment point for attaching an adornment and glyph may be performed in any number of ways. In some embodiments, the attachment manager 222 identifies object points as anchor points based on proximity of an adornment to a glyph. For example, assume an adornment is positioned along one edge of a glyph. In such a case, the object points associated with the edge (e.g., the end points of the edge) can be identified as anchor points. In other embodiments, the attachment manager 222 identifies object points as anchor points based on user selections. For example, a user may select (e.g., via an input device) a pair of object points along an edge of a glyph and indicate such object points as anchor points for a particular adornment. As described, anchor points may be identified in association with the glyph and/or the adornment.

By way of example only, and with reference to FIG. 3, assume a user positions adornment 304 proximate or adjacent to edge 306 of the glyph 302. In such a case, the attachment manager 222 may identify object point 1 and object point 12 of the glyph as anchor points. In some cases, the anchor points can be represented using the object point identifiers 1 and 12. Alternatively or additionally, the anchor points can be represented using the corresponding pixel positions of the object points. In this example, the corresponding pixel positions used to identify the anchor points may be (50, 50) for object point 1 and (60, 50) for object point 12. Further, in some cases, the attachment manager 222 may identify anchor points in association with the adornment. For example, the anchor points for the adornment may be identified to correspond with the anchor points of the glyph. In this example, the anchor points of the adornment may be identified as the coordinates (50,50) and (60,50).

Additionally or alternatively, an anchor point may be indicated or represented using a relative position(s) for attaching an adornment to a glyph. In such cases, the attachment manager 222, or other component (e.g., attachment dataset generator 222), may generate or determine a relative position(s) to indicate or represent an anchor point (s). A relative position generally refers to a point or position relative to a curve associated with the glyph and/or adornment. In this way, a relative position enables identification of an anchor point that does not necessarily align with an object point along a glyph path. For example, and with reference to FIG. 3, assume the adornment 304 is positioned between object point 1 and object point 12 of the path or edge 306 of the "H" glyph 302. In such a case, identifying object points 1 and 12 as the anchor points does not reflect a specific or precise position of where to attach the adornment. Using a relative position, however, enables an indication of various locations between the object points of 1 and 12, thereby identifying a more specific or precise position for attaching the adornment. In some implementations, an anchor point(s) in the form of a relative position(s) may be determined in each instance (e.g., as an attachment is identified). In other implementations, an anchor point(s) in the form of a relative position(s) may be determined in instances in which a point of attachment does not coincide or overlap with an existing object point of a glyph or adornment.

A relative position of a point of attachment may be identified in a number of ways. For instance, in some embodiments, a pixel location or coordinate may be used to specify a relative position. In other embodiments, parametric values may be used to specify a relative position. For example, Bezier splines are used to define the outlines of glyphs. A Bezier spline, or composite Bezier, refers to a set of Bezier curves specified by multiple points. In this regard, a Bezier spline can include a series of Bezier curves joined end to end, where the last point of one curve coincides with the starting point of the next curve. As such, a glyph defined by a Bezier spline generally includes a number of Bezier curves. A Bezier curve refers to a parametric curve that includes a set of points defining a smooth, continuous curve. A Bezier curve, or segment, is generally represented by two endpoints. In some cases, a Bezier curve includes control points (e.g., between the end points). The control points may act as magnets, pulling the curve in certain directions and influencing the bending of the curve.

In one embodiment, each object point of a glyph represents an endpoint of a Bezier curve, such that Bezier curves correspond with paths or segments between consecutive points of a glyph. The endpoints of a Bezier curve can correspond with a minimum and maximum parametric value. For example, one endpoint of a Bezier curve can correspond with a parametric value of 0, while the other endpoint of the Bezier curve can correspond with a parametric value of 1. In this regard, parametric values of the Bezier curve range from 0 to 1. The range between 0 to 1 can be mapped using any size of incremental values. For example, increments of 0.001 may be used along the Bezier curve such that parametric values are represented in increments of 0.001. As can be appreciated, a Bezier curve identifier may also be identified to indicate a specific Bezier curve (e.g., of a Bezier spline) associated with the relative position to indicate the anchor point.

The attachment dataset generator 224 is generally configured to generate an attachment dataset corresponding to the glyph and/or adornment. An attachment dataset generally refers to a set of data associated with the attachment of the glyph and adornment. In this regard, the attachment dataset may include data associated with the glyph and/or adornment. The attachment dataset can include various types of data. By way of example, and without limitation, the attachment dataset generator 224 can generate an attachment dataset that includes a glyph identifier that indicates a glyph, an adornment identifier that identifies an adornment, and/or a set of anchor point identifiers. An anchor point identifier can indicate or represent an anchor point in any of a number of ways, as described herein. For example, an anchor point can be identified in association with an object point. For instance, an anchor point may be represented using an object point identifier or a position (e.g., pixel location or coordinate) associated with an object point. As another example, an anchor point can be identified using a relative position, such as a parametric value representing a position along a path. For instance, an anchor point may be represented using a parametric value between 0 and 1 representing a position along a particular Bezier curve.

By way of example only, the attachment dataset generator 224 may generate an attachment dataset that includes an adornment identifier, a glyph identifier, a set of anchor point identifiers representing object points, and a set of anchor point identifiers representing parametric values (also referred to as relative anchor point identifiers):

| | | |
|---|---|---|
| {Adornment identifier: adornment1234 | | |
| {Glyph identifier: glyph5678 | | |

-continued

| | | |
|---|---|---|
| {Anchor point identifiers: | Anchor point 1: 1_(50,50); | |
| | Anchor point 2: 12 (60,50) | |
| {Relative anchor point identifiers: | | Anchor point 1: 0 |
| | | Anchor point 2: 1 |

In some embodiments, an attachment dataset is stored in association with a style sheet. In some cases, an attachment dataset is stored in a style sheet in association with the glyph and/or adornment. A style sheet generally refers to a file or form that is used to define style, such as font-related properties and how font resources are loaded. A style sheet may include various types of data, such as a font style, a font family, and various properties, such as variable font properties (e.g., size, weight, width, x-height, etc.) and corresponding values. A style sheet may be in the form of a cascading style sheet.

In some cases, the attachment dataset is stored in association with the glyph and adornment. For example, for a particular glyph included in a style sheet, an adornment identifier and anchor point identifiers can be stored. In other cases, some data of the attachment dataset is stored in association with the glyph, while other data of the attachment dataset is stored in association with the adornment. For example, a portion of data of the attachment dataset may be stored in association with a glyph (e.g., via a style sheet), and another portion of data may be stored as metadata in association with the adornment. In some cases, the portions of data may include overlapping data. For example, an indication of the anchor point(s) and an adornment identifier may be stored in a style sheet in association with the glyph, and the indication of the anchor point(s) may be stored as metadata in association with the adornment.

As can be appreciated, in some cases, multiple adornments may be attached to a particular glyph. In such cases, separate attachment datasets may be generated in association with each adornment. In other cases, a single attachment dataset associated with the glyph can be generated to include data associated with each adornment attachment. For example, the attachment dataset may include an array of adornment identifiers and corresponding anchor identifiers (e.g., anchor identifiers indicating object points or relative parametric values).

The edit propagator 226 is generally configured to manage edit propagation. In this regard, in association with an edit applied to a glyph, the edit propagator 226 manages the propagation of those edits to the corresponding adornment (e.g., the attached adornment). For example, the design manager 212 can obtain input data 230 including a modification of a variable font parameter 234 in association with a glyph and, thereafter, propagate corresponding edits to an appropriate adornment. Propagating edits to an attached adornment enables preservation of a desired spatial arrangement or visual appearance associated with the glyph and adornment, for example, such that the adornment maintains an arrangement and appearance of being seamless with the glyph. In this way, as a user initiates edits in association with a glyph, for example, to increase the width of the glyph, the adornment is similarly modified (e.g., expanded in width). Accordingly, as the adornment is automatically modified in accordance with modifications to the glyph, a user will less likely need to manually make modifications to the adornment and, thereby, reduce unnecessary use of computing resources that would otherwise be needed to manually edit the adornment.

Various types of edits applied to a glyph can be propagated to the corresponding adornment. In some embodiments, edits associated with a variable font property for a glyph are propagated to the adornment. As described, a variable font property can be a weight of the glyph, a width of the glyph, an x-height of the glyph, a slant of the glyph, etc. In this way, as an edit is made to or applied to a variable property associated with a glyph, a corresponding edit can be made to or applied to the attached adornment.

In some implementations, edits to variable font properties that result in scaling and/or translation modifications of object points are propagated to the adornment. Generally, modification of a property that effects scaling and/or translation of a glyph applies to each object point associated with the glyph. For example, and with reference to FIG. 3, the glyph "H" 302 has 12 object points. Assume a modification is made to the width of the glyph. In such a case, each of the 12 objects points is translated and/or scaled in accordance with the new width. As another example, assume a weight property is modified in association with a glyph. With this modification, the points, including the attachment points, associated with the glyph are edited in a horizontal translation manner. In accordance with embodiments described herein, points, including attachment points, associated with the adornment are modified in a same or similar manner. Accordingly, scaling or translation of points applied to the glyph to effectuate the variable font property modification are also applied to points (e.g., object points and/or anchor points) of the adornment. In this way, embodiments described herein automatically edit an adornment in a same or similar manner as edits applied to a glyph to preserve the association of the adornment and glyph relative to the anchor points.

The edit propagator 226 may initiate edit propagations to the corresponding adornment(s) based on any number of triggers or prompts. For example, in one embodiment, the edit propagator 226 initiates edit propagations to a corresponding adornment(s) based on an edit to a variable font property and/or a glyph. In this way, upon identifying a modification of a variable font property and/or a modification of the glyph in accordance with the modified variable font property, the edit propagator 226 can initiate edits to the adornment. In some implementations, a modification or edit of a variable font property can be initiated by a user. For example, a user or designer associated with a user device may select to modify a property associated with a variable font. For instance, a user may select to view a set of variable font properties. Based on the selection, various variable font properties may be displayed. For example, a width property, a weight property, an x-height property, a slant property, etc. may be presented. Along with each displayed variable font property, a set of corresponding values (e.g., value ranges) may be displayed. The user can select or provide input indicating a desired property value associated with the particular variable font property. For example, a sliding scale may be used to increase the weight of a particular font. As another example, a drop-down menu may be used to select a level of width (e.g., narrow, regular, wide). Based on the selected property value, the corresponding glyphs can be modified. In this way, the edit propagator 226 may initiate edit propagations when the variable font property is modified and/or the glyph is modified based on the variable font property modification.

In some cases, an edit propagation may be recognized to be applied to an adornment when a glyph modified, or to be modified, corresponds with, or is attached to, an adornment. Such a correspondence or attachment may be indicated or identified, for example, via an attachment dataset. In this regard, in accordance with a variable font property value change in association with a glyph (e.g., based on user input), an attachment dataset, or portion thereof, associated with the glyph may be accessed and used to identify a particular adornment is attached. Based on the adornment being identified as attached, the edit propagator 226 can propagate or apply edits to the corresponding adornment.

In some embodiments, when a variable font property is modified, a text engine may analyze the glyph(s) to determine a modification(s) and/or a new position(s) to apply to the glyph(s) based on the variable font property modification. In this way, modifications and/or new positions for each point and/or path of the glyph may be determined to render the glyph accordingly. In some cases, upon identifying and/or performing such modifications, the text engine may prompt the edit propagator 226 to perform edit propagations. Additionally or alternatively, in some cases, based on a modification of a variable font property, a notification or prompt is provided to a text engine to initiate new calculations for any corresponding glyphs. In such cases, the notification or prompt can be concurrently or sequentially provided to the edit propagator 226 to initiate edit propagation to the adornment.

As can be appreciated, in some cases, functionality described in association with the edit propagator 226 and a text engine may be performed concurrently and/or via a same component. For example, the edit propagator 226 may determine edits to apply to both the glyph and the adornment. In other cases, the components may communicate with one another (directly or indirectly) to effectuate propagation of edits of a glyph to a corresponding adornment.

The edit propagator 226 may identify or determine an edit to propagate or apply to an adornment in a number of ways. In embodiments, scaling or translation of points as applied to the glyph to effectuate a variable font property modification are also applied to points (e.g., object points and/or anchor points) of the adornment. In this way, the edit propagator 226 may determine or reference (e.g., based on a determination from a text engine) edits or modifications to be applied to a glyph based on a modification of a variable font property value. Thereafter, the same or similar modifications can be determined for application to the attached adornment. As such, embodiments described herein automatically edit an adornment in a same or similar manner as edits applied to a glyph to preserve the association of the adornment and glyph relative to the anchor points.

In some cases, the value or extent of a modification (e.g., scale or translation) to apply to the adornment may be the same as the value or extent of the modification applied to the glyph. For instance, assume a width of a glyph is scaled by a value of two. In such a case, the adornment is also scaled by two. In other cases, the value or extent of a modification (e.g., scale or translation) to apply to the adornment may be based on a proportion or percentage (or other factor or scale) as that applied to a corresponding glyph. For example, assume a width of a glyph is scaled by a value of two. In such a case, the adornment may be scaled by a value of 1.5 to scale the adornment at 75% of the extent of the scaling applied to the glyph. Such a proportion or percentage may be system defined, user defined (a user specifies a desired proportion via a user interface), etc.

As one example, assume text is edited such that a glyph position changes. Further assume, the anchor points corresponding with an adornment attachment to the glyph is 1 and 12. In such a case, the coordinates corresponding to 1 and 12 in the newer glyph position are determined. The transformation needed to move the line segment joining the older anchor points (e.g., {(50,50) to (60, 50)} to the newer line segment {(70,50) to (80,50)} is determined. The computed transformation is then applied to the adornment, for example, parametric or Bezier values. In cases in which scaling is applied (e.g., alternatively or additionally scaling the length of a line segment), the computed transformation matric can include translation as well as a scaling component.

As another example, assume a variable font property modification is selected by a user (e.g., increase or decrease width of a variable font). Assume such a modification impacts a position and/or scaling of a target glyph. In accordance with determining a transformation to be applied to the target glyph (e.g., via a text engine or via edit propagator 226), a transformation to be applied to the attached adornment is determined, such that the adornment maintains its attachment with the target glyph. As one example, a new position of anchor points is determined by accessing or referencing the attachment dataset. An anchor point(s) within the attachment dataset is adjusted, for example, using a relative anchor point. After calculating the transformation, the adornment can be modified accordingly.

Figure 4:
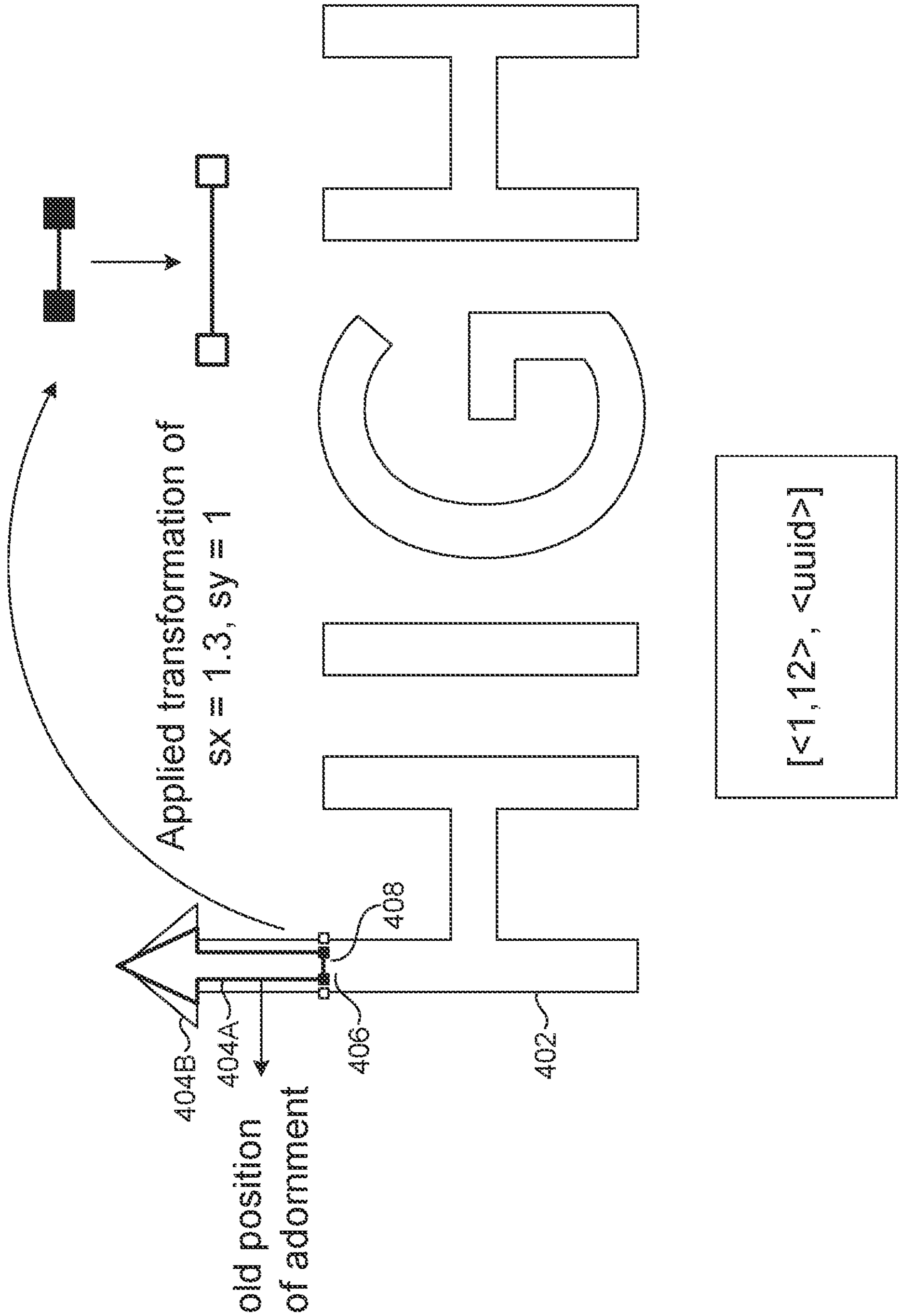
FIG. 4 provides an example modification applied to an adornment, in accordance with aspects of the technology described herein.

For instance, and with reference to FIG. 4, assume adornment 404A is attached to the glyph 402 at attachment points 406 and 408. Further assume the attachment points 406 and 408 initially aligned with an initial weight of the glyph 402. Now assume a user modifies the weight of the variable font, thereby increasing the weight of the glyph 402 to the presented weight of the glyph 402. In accordance with adjusting the variable font property weight, the position of anchor point identifiers 1 (previously corresponding with attachment point 406) and 12 (previously corresponding with attachment point 408) for the glyph 402 is changed to (110, 50) and (120, 50) respectively. Based on a comparison of the previous positions (e.g., attachment points 406 and 408), assume a scaling of 1.3 units results. In such a case, a scaling 1.3 for the x-coordinate and a scaling of 1 for the y-coordinate is applied to the adornment, and points associated therewith (e.g., anchor points identified in association with the adornment). As such, the adornment 404B is transformed or modified to correspond to the new weight of the glyph 402.

The edit propagator 226, or other component, can output or provide the adornment edits or modifications 240, such that the adornment is modified appropriately in relation to a modification to a corresponding glyph. In this regard, in accordance with rendering or displaying a modified glyph (e.g., based on a modification to a value of a variable font property associated with the glyph), the adornment is rendered and/or displayed in a similar or same manner. As such, as a user modifies properties of the glyph, the adornment desired to be attached or linked to the glyph is modified accordingly.

Figure 5A:
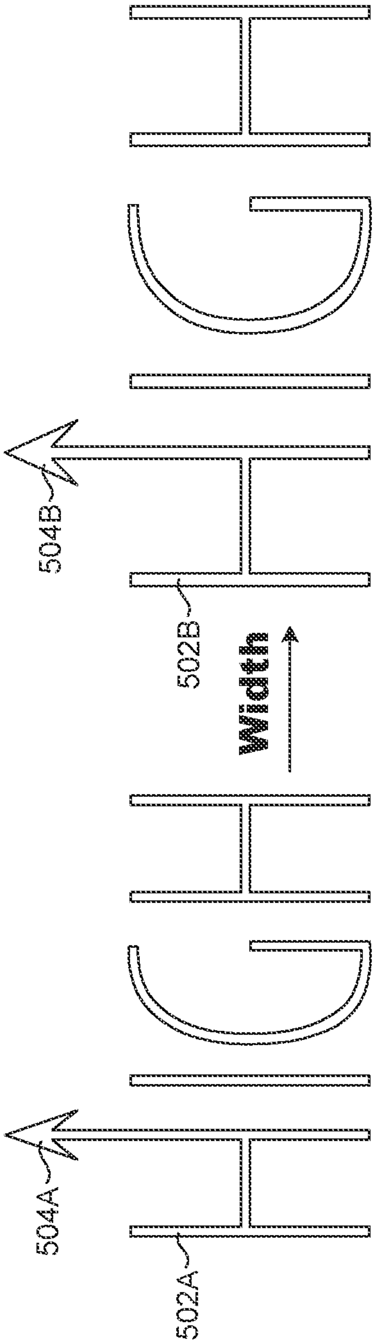
FIGS. 5A-5B provides example glyph modifications propagated to an adornment, in accordance with aspects of the technology described herein.

By way of example only, and with reference to FIG. 5A, FIG. 5A provides an example illustration of a glyph 502A with an adornment 504A attached to the glyph 502A. Assume the user increases the width associated with the variable font. In such a case, the font width is increased, as shown by the increased width of glyph 502B. In accordance with embodiments described herein, the adornment 504A is modified or transformed to adornment 504B to reflect a linkage or connection between the glyph 502 and adornment 504. In this way, the glyph 502B and the adornment 504B appear seamless, or as a unit. As such, the user need not reposition the adornment to effectuate the appearance of unity upon a modification to the width of the font.

Figure 5B:
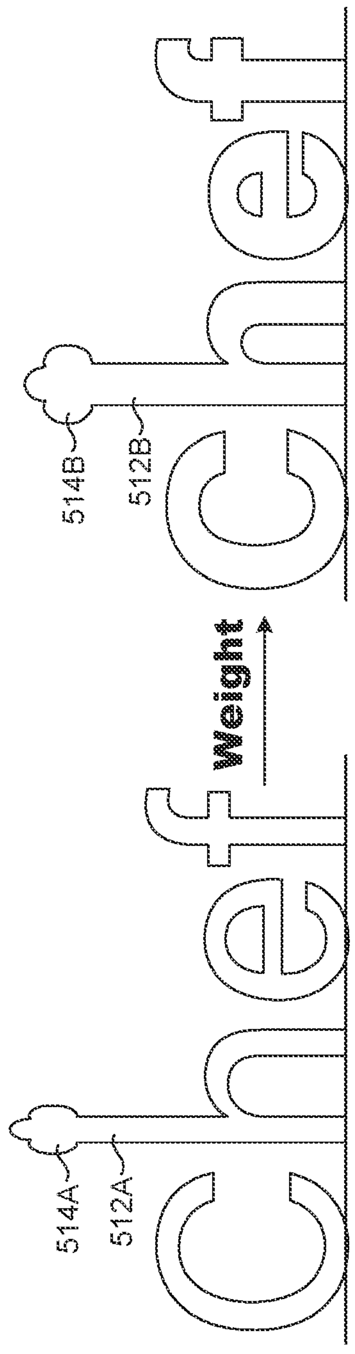

As another example, and with reference to FIG. 5B, FIG. 5B provides an example illustration of a glyph 512A with an adornment 514A attached to the glyph 512A. Assume the user increases the weight associated with the variable font. In such a case, the font weight is increased, as shown by the increased weight of glyph 512B. In accordance with embodiments described herein, the adornment 514A is modified or transformed to adornment 514B to reflect a linkage or connection between the glyph 512 and adornment 514. In this way, the glyph 512B and the adornment 514B appear seamless, or as a unit. Accordingly, the user need not reposition or rearrange the adornment to effectuate the appearance of unit upon a modification to the weight of the font.

Figure 6:
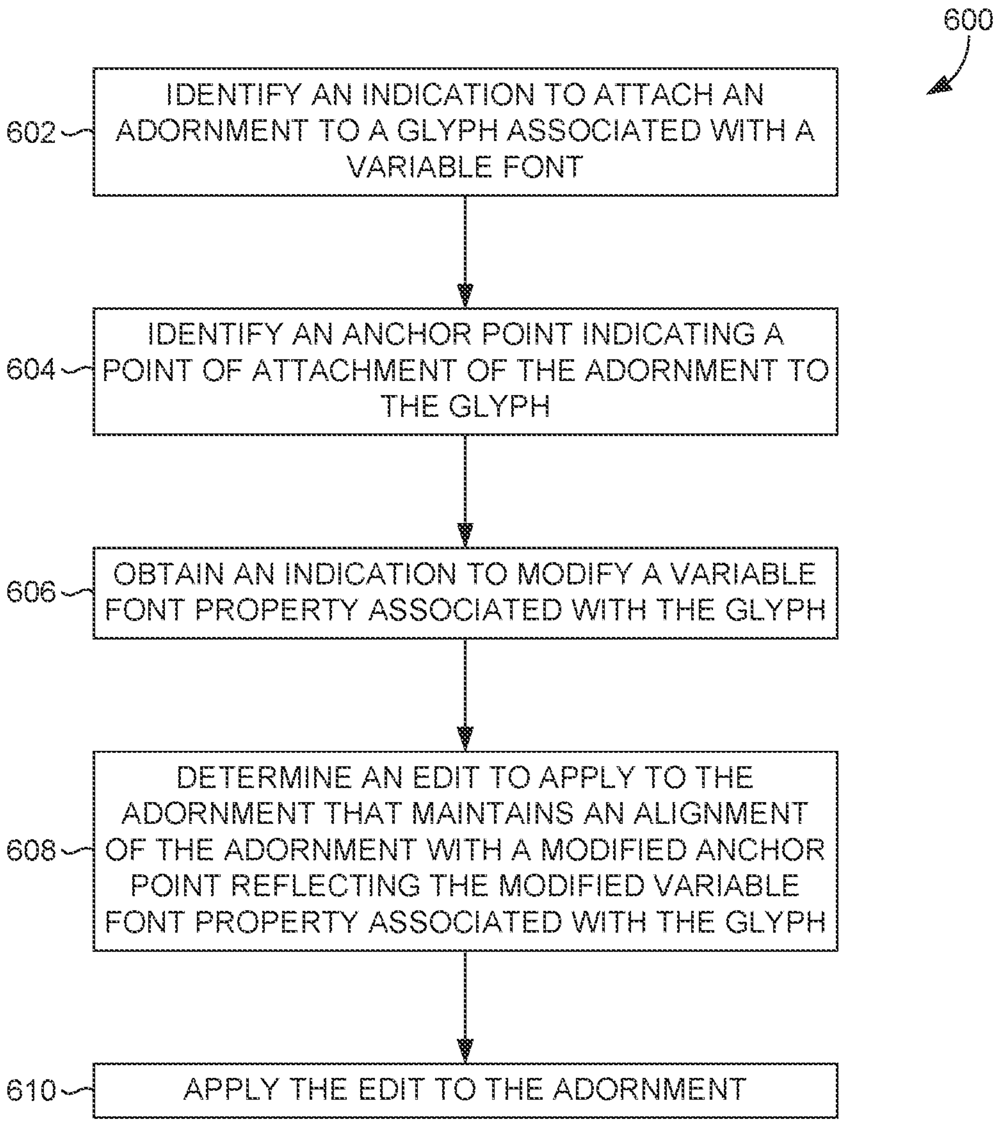
FIG. 6 provides an example method flow for automated propagation of glyph edits to corresponding adornment, in accordance with aspects of the technology described herein.
Figure 7:
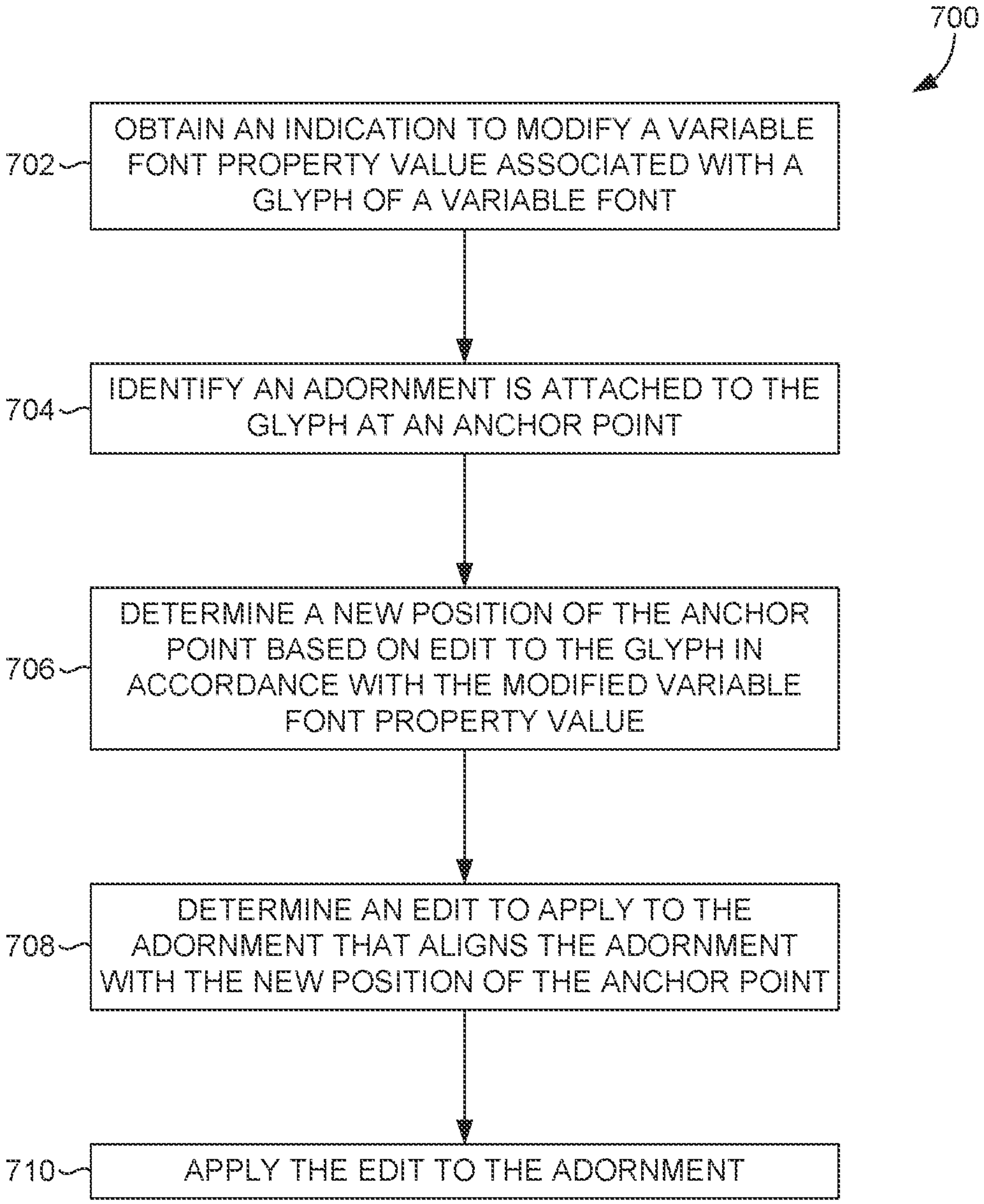
FIG. 7 provides another example method flow for automated propagation of glyph edits to corresponding adornment, in accordance with aspects of the technology described herein.
Figure 8:
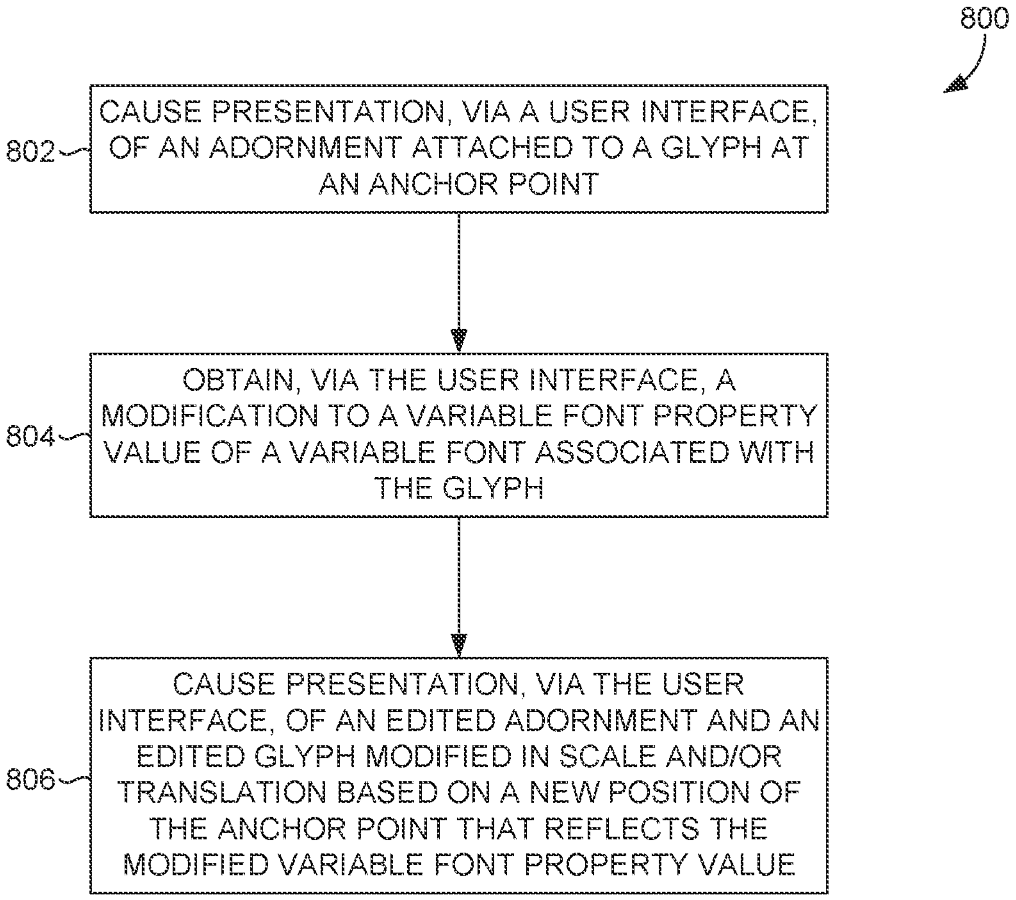
FIG. 8 provides another example method flow for automated propagation of glyph edits to corresponding adornment, in accordance with aspects of the technology described herein.

As described, various implementations can be used in accordance with embodiments described herein. FIGS. 6-8 provide methods of facilitating automated propagation of glyph edits to corresponding adornments, in accordance with embodiments described herein. The methods 600, 700, and 800 can be performed by a computer device, such as device 900 described below. The flow diagrams represented in FIGS. 6-8 are intended to be exemplary in nature and not limiting. For example, flow diagrams represented in FIGS. 6-8 represent various approaches used to facilitate automated propagation of glyph edits to corresponding adornments, but are not intended to reflect all combination of technologies and approaches that may be used in accordance with embodiments described herein.

With respect to FIG. 6, FIG. 6 provides one example method flow 600 for propagating glyph edits to corresponding adornments, in accordance with embodiments described herein. Initially, in method flow 600, at block 602, an indication to attach an adornment to a glyph associated with a variable font is identified. In some embodiments, the indication to attach the adornment to the glyph is provided, via a user interface, based on proximity of the adornment relative to the glyph. At block 604, an anchor point indicating a point of attachment of the adornment to the glyph is identified. In some cases, the anchor point aligns with an end point of an edge the adornment or an object point of the glyph. In embodiments, the anchor point is represented by a relative position along an edge of the glyph. For example, an anchor point can be identified by identifying a Bezier curve associated with an edge of the glyph for attaching the adornment and, thereafter, identifying a parametric value of the Bezier curve corresponding with the point of attachment.

At block 606, an indication to modify a variable font property associated with the glyph is obtained. A variable font property may include, for example, a weight, a width, or an x-height. At block 608, an edit to apply to the adornment that maintains an alignment of the adornment with a modified anchor point reflecting the modified variable font property associated with the glyph is determined. In embodiments, the edit to apply to the adornment is based on an edit to apply to the glyph in accordance with the modified variable font property. In some cases, determining the edit to apply to the adornment includes determining the modified anchor point based on an edit to apply to the glyph. An edit may include, for instance, a scale, a translation, or a combination thereof. The edit to apply to the adornment may be determined based on, for example, an indication to modify the variable font property associated with the glyph. At block 610, the edit is applied to the adornment. In this way, the modification of the variable font property applied to the glyph is seamlessly propagated to the adornment.

Turning now to FIG. 7, FIG. 7 provides another example of facilitating automated propagation of glyph edits to corresponding adornments. Initially, at block 702, an indication to modify a variable font property value associated with a glyph of a variable font is obtained. In embodiments, before obtaining an indication to modify a variable font property value, an indication, provided via a user interface, to attach the adornment to the glyph is identified. Further, a position of the anchor point indicating a point of attachment of the adornment to the glyph is identified. The position of the anchor point can be represented using a relative position along a Bezier curve between a first object point and a second object point of the glyph. At block 704, an adornment is identified as attached to the glyph at an anchor point. In some implementations, the adornment is identified as attached to the glyph using an attachment dataset included in a style sheet in association with the glyph. For example, the attachment data can include an adornment identifier identifying the adornment. At block 706, a new position of the anchor point is determined based on edit to the glyph in accordance with the modified variable font property value. In some cases, a new position of the anchor point is determined based on a relative position of the anchor point along a Bezier curve associated with an edge of the glyph corresponding with the anchor point. At block 708, an edit to apply to the adornment that aligns the adornment with the new position of the anchor point is determined. The edit applied to the adornment may be an affine transformation. At block 710, the edit is applied to the adornment. In this way, the modification of the variable font property applied to the glyph is seamlessly propagated to the adornment.

With reference to FIG. 8, FIG. 8 provides another example of facilitating automated propagation of glyph edits to corresponding adornments, in accordance with embodiments described herein. At block 802, a processing device implementing the present disclosure causes presentation, via a user interface, of an adornment attached to a glyph at an anchor point. In embodiments, the adornment is attached to the glyph based on a user selection to move the adornment adjacent to the glyph. In some cases, the anchor point coincides with an object point of the glyph. At block 804, the processing device implementing the present disclosure obtains, via the user interface, a modification to a variable font property value of a variable font associated with the glyph. For example, a user may select to modify (e.g., via a slider or menu) a width or weight of a particular variable font. At block 806, the processing device implementing the present disclosure causes presentation, via the user interface, of an edited adornment and an edited glyph modified in scale and/or translation based on a new position of the anchor point that reflects the modified variable font property value. In some cases, the new position of the anchor point is determined based on a relative position of the anchor point along a Bezier curve between a first object point and a second object point of the glyph.

Accordingly, we have described various aspects of technology directed to systems, methods, and graphical user interfaces for efficiently and effectively propagating glyph edits to corresponding adornments in an automated manner. It is understood that various features, sub-combinations, and modifications of the embodiments described herein are of utility and may be employed in other embodiments without reference to other features or sub-combinations. Moreover, the order and sequences of steps shown in the example methods 600, 700, and 800 are not meant to limit the scope of the present disclosure in any way, and in fact, the steps may occur in a variety of different sequences within embodiments hereof. Such variations and combinations thereof are also contemplated to be within the scope of embodiments of this disclosure.

Having briefly described an overview of aspects of the technology described herein, an exemplary operating environment in which aspects of the technology described herein may be implemented is described below in order to provide a general context for various aspects of the technology described herein.

Figure 9:
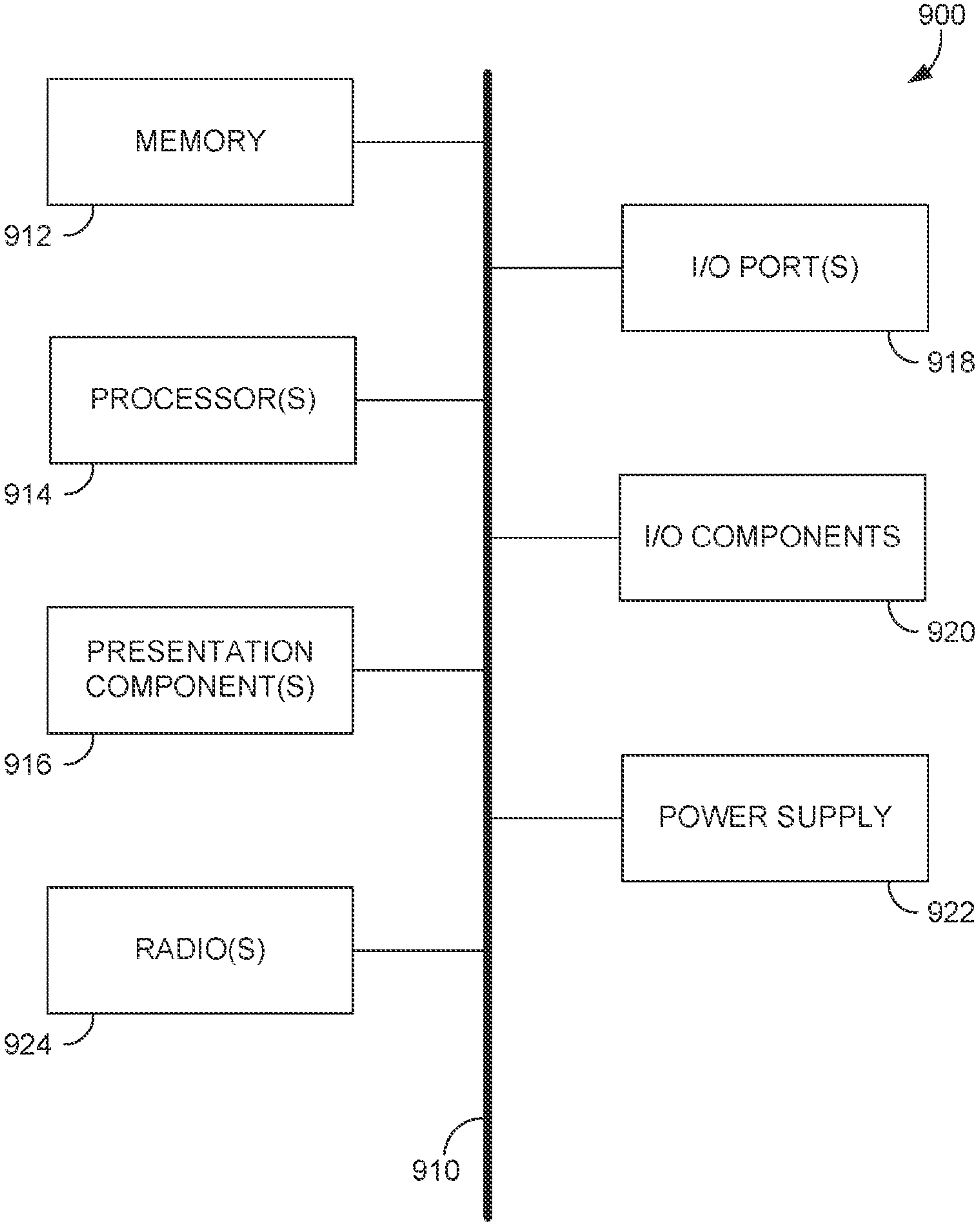
FIG. 9 is a block diagram of an exemplary computing environment suitable for use in implementing aspects of the technology described herein.

Referring to the drawings in general, and to FIG. 9 in particular, an exemplary operating environment for implementing aspects of the technology described herein is shown and designated generally as computing device 900. Computing device 900 is just one example of a suitable computing environment and is not intended to suggest any limitation as to the scope of use or functionality of the technology described herein. Neither should the computing device 900 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output (I/O) ports 918, I/O components 920, an illustrative power supply 922, and a radio(s) 924. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 9 is merely illustrative of an exemplary computing device that can be used in connection with one or more aspects of the technology described herein. Distinction is not made between such categories as "workstation," "server," "laptop," and "handheld device," as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory 912 may be removable, non-removable, or a combination thereof. Exemplary memory includes solid-state memory, hard drives, and optical-disc drives. Computing device 900 includes one or more processors 914 that read data from various entities such as bus 910, memory 912, or I/O components 920. Presentation component(s) 916 present data indications to a user or other device. Exemplary presentation components 916 include a display device, speaker, printing component, and vibrating component. I/O port(s) 918 allow computing device 900 to be logically coupled to other devices including I/O components 920, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 914 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 900. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

A computing device may include radio(s) 924. The radio 924 transmits and receives radio communications. The computing device may be a wireless terminal adapted to receive communications and media over various wireless networks. Computing device 900 may communicate via wireless protocols, such as code division multiple access (“CDMA”), global system for mobiles (“GSM”), or time division multiple access (“TDMA”), as well as others, to communicate with other devices. The radio communications may be a short-range connection, a long-range connection, or a combination of both a short-range and a long-range wireless telecommunications connection. When we refer to “short” and “long” types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms “step” and “block” may be used herein to connote different elements of methods employed, the terms should not be interpreted as implying any particular order among or between various steps herein disclosed unless and except when the order of individual steps is explicitly described.

What is claimed is:

1. A computer-implemented method comprising:

identifying, via a graphical user interface, an indication to attach an adornment to a glyph associated with a variable font, the adornment comprising an external object in a form of a design to attach to the glyph for visual appeal;

identifying an anchor point indicating a point of attachment of the adornment to the glyph;

obtaining, via the graphical user interface, an indication to modify a variable font property associated with the glyph;

based on the indication to modify the variable font property, determining a modified anchor point based on an edit to apply to the glyph in accordance with the modified variable font property;

determining an edit to apply to the adornment that maintains an alignment of the adornment with the modified anchor point determined to reflect the modified variable font property associated with the glyph; and applying the edit to the adornment.

2. The method of claim 1, wherein the indication to attach the adornment to the glyph is provided, via the graphical user interface, based on proximity of the adornment relative to the glyph.

3. The method of claim 1, wherein the anchor point aligns with an end point of an edge the adornment.

4. The method of claim 1, wherein the anchor point corresponds with an object point of the glyph.

5. The method of claim 1, wherein the anchor point is represented by a relative position along an edge of the glyph.

6. The method of claim 1, wherein identifying the anchor point comprises:

identifying a Bezier curve associated with an edge of the glyph for attaching the adornment;

identifying a parametric value of the Bezier curve corresponding with the point of attachment.

7. The method of claim 1, wherein the variable font property comprises a weight, a width, or an x-height.

8. The method of claim 1, wherein the edit to apply to the adornment is based on the edit to apply to the glyph in accordance with the modified variable font property.

9. The method of claim 1, wherein the edit comprises a scale, a translation, or a combination thereof.

10. The method of claim 1, wherein the edit to apply to the adornment is determined based on the indication to modify the variable font property associated with the glyph.

11. A non-transitory computer-readable medium storing executable instructions, which when executed by a processing device, cause the processing device to perform operations comprising:

obtaining an indication to modify a variable font property value associated with a glyph of a variable font;

identifying an adornment is attached to the glyph at an anchor point, the adornment comprising an external object in a form of a design to attach to the glyph for visual appeal;

determining a new position of the anchor point based on an edit to the glyph in accordance with the modified variable font property value, wherein the new position of the anchor point is determined based on a relative position of the anchor point along a Bezier curve associated with an edge of the glyph corresponding with the anchor point;

determining an edit to apply to the adornment that aligns the adornment with the new position of the anchor point identified to reflect the modified variable font property value associated with the glyph; and applying the edit to the adornment.

12. The non-transitory computer-readable medium of claim 11, wherein the adornment is identified as attached to the glyph using an attachment dataset included in a style sheet in association with the glyph, the attachment dataset including an adornment identifier identifying the adornment.

13. The non-transitory computer-readable medium of claim 11, wherein the edit applied to the adornment comprises an affine transformation.

14. The non-transitory computer-readable medium of claim 11 further comprising:

identifying an indication, provided via a user interface, to attach the adornment to the glyph; and identifying a position of the anchor point indicating a point of attachment of the adornment to the glyph, the position of the anchor point represented using a relative position along the Bezier curve between a first object point and a second object point of the glyph.

15. A system comprising:

a memory component; and a processing device coupled to the memory component, the processing device to perform operations comprising:

causing presentation, via a user interface, of an adornment attached to a glyph at an anchor point, the adornment comprising an external object in a form of a design to attach to the glyph for visual appeal;

obtaining, via the user interface, a modification to a variable font property value of a variable font associated with the glyph; and causing presentation, via the user interface, of an edited adornment and an edited glyph automatically modified in scale or translation based on a new position of the anchor point that reflects the modified variable font property value.

16. The media of claim 15, wherein the new position of the anchor point is determined based on a relative position of the anchor point along a Bezier curve between a first object point and a second object point of the glyph.

17. The media of claim 15, wherein the adornment is attached to the glyph based on a user selection to move the adornment adjacent to the glyph.

18. The media of claim 15, wherein the anchor point coincides with an object point of the glyph.

* * * * *